US012261951B2

United States Patent
Kawai

(10) Patent No.: US 12,261,951 B2
(45) Date of Patent: Mar. 25, 2025

(54) CRYPTOGRAPHIC SYSTEM, ENCRYPTED DATA CONVERSION APPARATUS, AND COMPUTER READABLE MEDIUM

(71) Applicant: Mitsubishi Electric Corporation, Tokyo (JP)

(72) Inventor: Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 399 days.

(21) Appl. No.: 17/835,417

(22) Filed: Jun. 8, 2022

(65) Prior Publication Data

US 2022/0303132 A1 Sep. 22, 2022

Related U.S. Application Data

(63) Continuation of application No. PCT/JP2020/004262, filed on Feb. 5, 2020.

(51) Int. Cl.
*H04L 29/06* (2006.01)
*G09C 1/00* (2006.01)
(Continued)

(52) U.S. Cl.
CPC ............. *H04L 9/0869* (2013.01); *G09C 1/00* (2013.01); *H04L 9/14* (2013.01)

(58) Field of Classification Search
CPC ....... H04L 9/0869; H04L 9/14; H04L 9/3073; H04L 9/0662; G09C 1/00
See application file for complete search history.

(56) References Cited

U.S. PATENT DOCUMENTS 9,304,703 B1 4/2016 Ignomirello
9,432,192 B1 * 8/2016 Pogde .................. H04L 9/0836
(Continued)

FOREIGN PATENT DOCUMENTS

JP 2014-507841 A 3/2014
JP 2015-230379 A 12/2015
(Continued)

OTHER PUBLICATIONS

Armknecht et al., "Transparent Data Deduplication in the Cloud," User Interface Software and Technology, Oct. 12, 2015, pp. 886-900, XP058523979.
(Continued)

*Primary Examiner* — Harunur Rashid
(74) *Attorney, Agent, or Firm* — Birch, Stewart, Kolasch & Birch, LLP

(57) ABSTRACT

A deduplication system (100) includes encryption apparatuses (400), a conversion key generation apparatus (500), a tag conversion apparatus (600), and a match determination apparatus (700). The encryption apparatuses (400) each generate encryption tag (ETag) using an encryption key (ek) and plaintext (M). The conversion key generation apparatus (500) generates a conversion key (ck) using the encryption key (ek) and a conversion key generation key (tk). The tag conversion apparatus (600) converts an encryption tag (ETag) for which the same plaintext (M) has been used into an encryption tag (T) that takes the same value regardless of a value of the encryption key (ek) used for the encryption tag (ETag) by applying the conversion key (ck) to the encryption tag (ETag). The match determination apparatus (700) determines whether the values of two encryption tags (T) match.

3 Claims, 13 Drawing Sheets

(51) Int. Cl.
  *H04L 9/08* (2006.01)
  *H04L 9/14* (2006.01)

(56) References Cited

U.S. PATENT DOCUMENTS

| | | | |
|---|---|---|---|
| 2012/0311327 A1* | 12/2012 | Liu | H04L 63/0435 |
| | | | 713/167 |
| 2014/0019765 A1 | 1/2014 | Montalvo et al. | |
| 2014/0223118 A1 | 8/2014 | Ignomirello | |
| 2014/0223196 A1 | 8/2014 | Gnomirello | |
| 2014/0279911 A1 | 9/2014 | Ignomirello | |
| 2015/0127975 A1 | 5/2015 | Patterson et al. | |
| 2015/0248402 A1 | 9/2015 | Patterson, III et al. | |
| 2015/0358302 A1 | 12/2015 | Noguchi | |
| 2016/0217047 A1 | 7/2016 | Ignomirello et al. | |
| 2016/0218737 A1 | 7/2016 | Ignomirello | |
| 2016/0364145 A1 | 12/2016 | Smith et al. | |
| 2017/0026172 A1 | 1/2017 | Ignomirello | |
| 2017/0169233 A1 | 6/2017 | Hsu et al. | |
| 2017/0310479 A1* | 10/2017 | Sato | H04L 9/0861 |
| 2018/0034819 A1 | 2/2018 | Yan | |
| 2018/0129572 A1 | 5/2018 | Ignomirello et al. | |
| 2018/0136850 A1 | 5/2018 | Ignomirello | |
| 2018/0198805 A1 | 7/2018 | Ignomirello | |
| 2018/0267865 A1 | 9/2018 | Ignomirello et al. | |
| 2018/0270069 A1* | 9/2018 | Yan | H04L 9/0894 |
| 2019/0012083 A1 | 1/2019 | Smith et al. | |
| 2019/0026476 A1* | 1/2019 | Van Riel | G06F 21/6218 |
| 2019/0114087 A1 | 4/2019 | Ignomirello | |
| 2019/0138504 A1 | 5/2019 | Patterson, III et al. | |
| 2019/0146881 A1 | 5/2019 | Ignomirello | |
| 2020/0042190 A1 | 2/2020 | Ignomirello | |
| 2020/0151344 A1 | 5/2020 | Hsu et al. | |

FOREIGN PATENT DOCUMENTS

| | | |
|---|---|---|
| JP | 2016-509310 A | 3/2016 |
| JP | 2016-158189 A | 9/2016 |
| JP | 2018-508864 A | 3/2018 |
| JP | 2018-142314 A | 9/2018 |

OTHER PUBLICATIONS

Bellare et al., "DupLESS: Server-Aided Encryption for Deduplicated Storage," Usenix, The Advanced Computing Systems Association, Aug. 14, 2013, pp. 179-194, XP061014446.

Bellare et al., "Server-Aided Encryption for Deduplication Storage," retrieved from https://www.usenix.org/sites/default/files/conference/protected-files/bellare_sec13_slides.pdf., Aug. 16, 2013, 27 pages total, XP093009536.

Extended European Search Report for corresponding European Application No. 20918088.4, dated Jan. 24, 2023.

Kwon et al., "Secure deduplication with reliable and revocable key management in fog computing," Peer-to-Peer Networking and Applications, vol. 12, No. 4, 2019 (Published online Oct. 8, 2018), pp. 850-864.

Li et al., "Secure Deduplication with Efficient and Reliable Convergent Key Management," IEEE Transactions on Parallel and Distributed Systems, vol. 25, No. 6, Jun. 2014, pp. 1615-1625.

European Communication pursuant to Article 94(3) EPC for European Application No. 20918088.4, dated Apr. 3, 2024.

Bellare et al., "Message-Locked Encryption and Secure Deduplication", Eurocrypt, 2013, pp. 296-312.

International Search Report, issued in PCT/JP2020/004262, dated Apr. 14, 2020.

Written Opinion of the International Searching Authority, issued in PCT/JP2020/004262, dated Apr. 14, 2020.

* cited by examiner

CRYPTOGRAPHIC SYSTEM, ENCRYPTED DATA CONVERSION APPARATUS, AND COMPUTER READABLE MEDIUM

CROSS REFERENCE TO RELATED APPLICATIONS

This application is a Continuation of PCT International Application No. PCT/JP2020/004262, filed on Feb. 5, 2020, which is hereby expressly incorporated by reference into the present application.

TECHNICAL FIELD

The present invention relates to a deduplication system that removes one of two pieces of encrypted data when two pieces of encrypted data are duplicate.

BACKGROUND ART

A cryptographic system that can remove duplicate encrypted data is able to determine whether encrypted plaintexts match or not in their encrypted data without decrypting the encrypted data (Patent Literature 1 and Non-Patent Literature 1, for instance).

A core idea of common encryption that allows deduplication, like Patent Literature 1 and Non-Patent Literature 1, is to convert plaintext into a bit string of a fixed length via a hash function, make it an encryption key, and perform encryption with the encryption key. Thus, if plaintexts are the same, encryption keys generated from the same plaintexts will be the same keys, and when deterministic encryption like AES (Advanced Encryption Standard) is used, the same plaintexts are turned into ciphertexts of the same value.

On the other hand, if plaintexts are different even in one bit, completely different keys are generated and the values of the generated ciphertexts are also different. With such a system, a user can utilize encryption that can remove duplication of ciphertexts without having a key.

For such encryption that allows deduplication, it is known that ciphertext does not have de facto standard security in cryptography called indistinguishability.

In addition, since per-user keys are not present and ciphertexts for individual users cannot be distinguished from each other, encryption like the conventional art is subject to the risk of leakage of plaintext information for one user's ciphertext from other users, in combination with the absence of indistinguishability mentioned above.

CITATION LIST

Patent Literature

Patent Literature 1: JP 2014-507841

Non-Patent Literature

Non-Patent Literature 1: Mihir Bellare, Sriram Keelveedhi, Thomas Ristenpart: "Message-Locked Encryption and Secure Deduplication". EUROCRYPT 2013: 296-312

SUMMARY OF INVENTION

Technical Problem

This invention aims to provide a cryptographic system in which (1), (2), and (3) below are possible.
(1) An encryption key can be set on a per-user basis.
(2) Ciphertext cannot be deduplicated at a point when a user has generated the ciphertext with an encryption key. However, the ciphertext satisfies indistinguishability.
(3) A ciphertext generated with an encryption key can be converted to a ciphertext that can be deduplicated only if the user permits it.

Solution to Problem

A cryptographic system according to the present invention includes:
  an encryption unit to, using a first key and plaintext, generate first encrypted data which is an encryption of the plaintext;
  a third key generation unit to generate a third key using the first key and a second key; and
  an encrypted data conversion unit to, by applying the third key to the first encrypted data, convert the first encrypted data for which the same plaintext has been used into second encrypted data that takes the same value regardless of a value of the first key used for the first encrypted data.

Advantageous Effects of Invention

The cryptographic system of this invention can provide a cryptographic system in which (1), (2), and (3) below are possible.
(1) An encryption key can be set on a per-user basis.
(2) Ciphertext cannot be deduplicated at a point when a user has generated the ciphertext with an encryption key. However, the ciphertext satisfies indistinguishability.
(3) A ciphertext generated with an encryption key can be converted to a ciphertext that can be deduplicated only if the user permits it.

DESCRIPTION OF EMBODIMENTS

Figure 1:
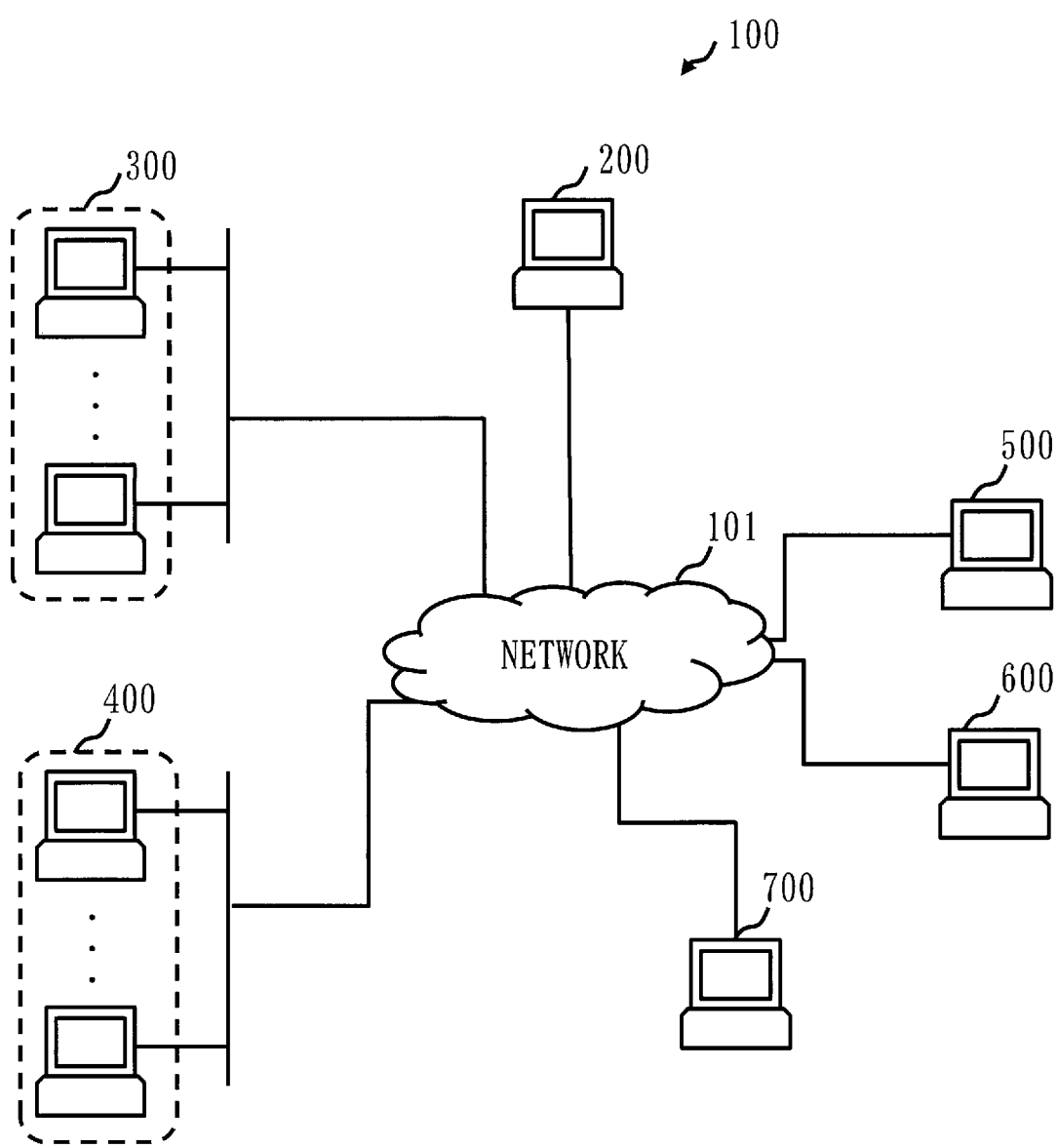
FIG. 1 is a diagram of Embodiment 1 and is a block diagram showing a configuration of a deduplication system 100.

Embodiments are described below with the drawings. In the drawings, the same or equivalent portions are denoted with the same reference characters. In the description of the embodiments, description will be omitted or simplified as appropriate for the same or equivalent portions.

Embodiment 1

A deduplication system 100 in Embodiment 1 is described. The deduplication system 100 is a cryptographic system that removes ciphertexts for which ciphertexts are duplicate.

FIG. 1 shows a system configuration of the deduplication system 100.

As shown in FIG. 1, the deduplication system 100 includes a common parameter generation apparatus 200, multiple user key generation apparatuses 300, multiple encryption apparatuses 400, a conversion key generation apparatus 500, a tag conversion apparatus 600, and a match determination apparatus 700. The tag conversion apparatus 600 converts an encryption tag ETag into an encryption tag T. The encryption tag ETag is first encrypted data and the encryption tag T is second encrypted data. The encryption apparatus 400 corresponds to an encryption unit, the conversion key generation apparatus 500 corresponds to a third key generation unit, the tag conversion apparatus 600 corresponds to an encrypted data conversion unit, and the match determination apparatus 700 corresponds to a match determination unit.

The common parameter generation apparatus 200, the multiple user key generation apparatuses 300, the multiple encryption apparatuses 400, the conversion key generation apparatus 500, the tag conversion apparatus 600, and the match determination apparatus 700 are computers.

In the deduplication system 100, the common parameter generation apparatus 200, the multiple user key generation apparatuses 300, the multiple encryption apparatuses 400, the conversion key generation apparatus 500, the tag conversion apparatus 600, and the match determination apparatus 700 are connected to a network 101. The network 101 may be the Internet or a LAN (Local•Area•Network) installed in a corporation.

The network 101 is a communication channel connecting the common parameter generation apparatus 200, the multiple user key generation apparatuses 300, the multiple encryption apparatuses 400, the conversion key generation apparatus 500, the tag conversion apparatus 600, and the match determination apparatus 700 with each other.

The common parameter generation apparatus 200 creates a common parameter for use in the deduplication system 100 and transmits the common parameter to the multiple user key generation apparatuses 300, the multiple encryption apparatuses 400, the conversion key generation apparatus 500, and the tag conversion apparatus 600 over the network 101. The common parameter may instead be sent directly to parties of the deduplication system 100 such as by postal mail without going through the network 101.

Each user key generation apparatus 300 generates a user key and transmits the user key to the encryption apparatus 400 and the conversion key generation apparatus 500. Each encryption apparatus 400 generates an encryption tag ETag with plaintext M and the user key transmitted from the user key generation apparatus 300 as input and transmits the ETag to the tag conversion apparatus 600. The conversion key generation apparatus 500 receives the user key from the user key generation apparatus 300 and generates a conversion key ck from the user key. The tag conversion apparatus 600 receives the conversion key ck from the conversion key generation apparatus 500 and receives the encryption tag ETag from the encryption apparatus 400. The tag conversion apparatus 600 converts the encryption tag ETag as the first encrypted data into an encryption tag T as the second encrypted data that can be deduplicated, using the conversion key ck. The tag conversion apparatus 600 transmits the encryption tag T to the match determination apparatus 700. The match determination apparatus 700 receives multiple encryption tags T from the tag conversion apparatus 600, determines whether the encryption tags T match, and outputs a determination result.

A single computer may implement any two, any three, or four of the user key generation apparatuses 300, the encryption apparatuses 400, the conversion key generation apparatus 500, and the tag conversion apparatus 600.

Figure 2:
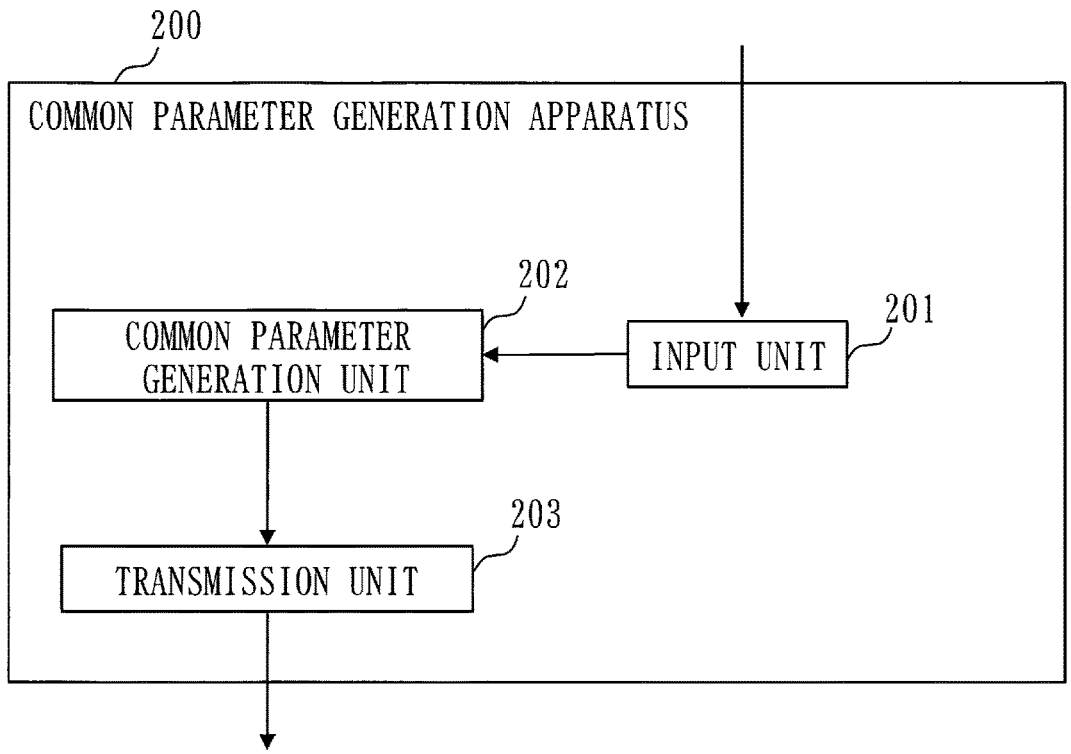
FIG. 2 is a diagram of Embodiment 1 and is a block diagram showing a configuration of a common parameter generation apparatus 200.

FIG. 2 is a block diagram showing a configuration of the common parameter generation apparatus 200. The common parameter generation apparatus 200 includes an input unit 201, a common parameter generation unit 202, and a transmission unit 203. Although not shown, the common parameter generation apparatus 200 includes a recording medium for storing data used in the components of the common parameter generation apparatus 200. To the input unit 201, a bit length k of the key used in the deduplication system 100 is input. The common parameter generation unit 202 generates a common parameter to be a basis of computations executed in the deduplication system 100. Although not shown, the common parameter generation unit 202 may have random number generation functionality in order to generate common parameters. The transmission unit 203 transmits the common parameter generated by the common parameter generation unit 202 to the multiple user key generation apparatuses 300.

Figure 3:
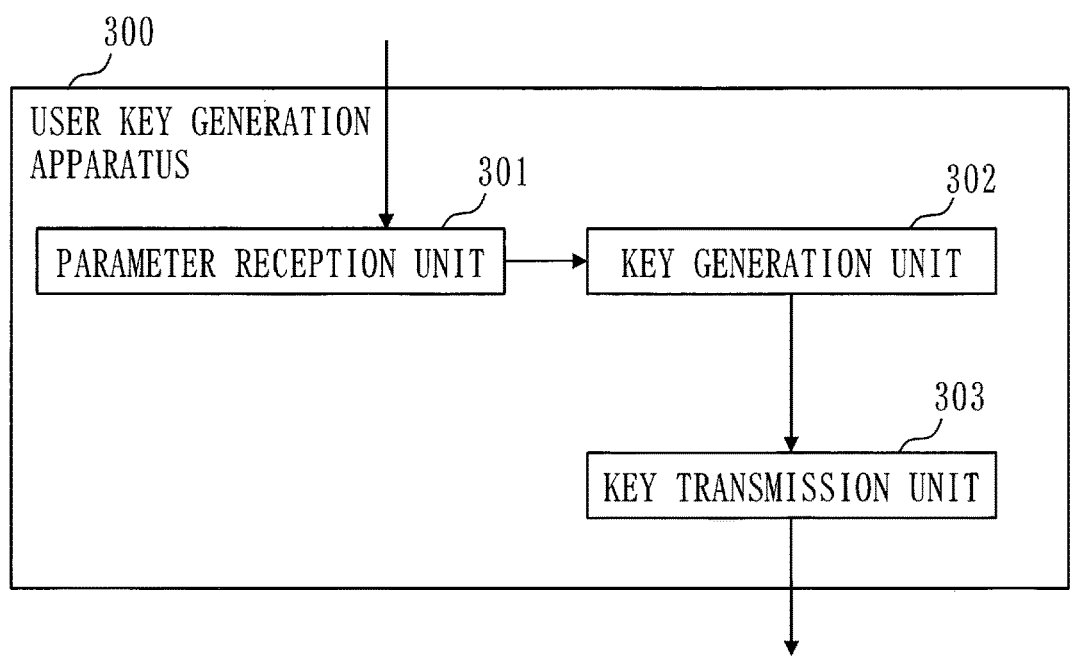
FIG. 3 is a diagram of Embodiment 1 and is a block diagram showing a configuration of a user key generation apparatus 300.

FIG. 3 is a block diagram showing a configuration of the user key generation apparatus 300. The user key generation apparatus 300 includes a parameter reception unit 301, a key generation unit 302, and a key transmission unit 303. Although not shown, the user key generation apparatus 300 includes a recording medium for storing data used in the components of the user key generation apparatus 300. The parameter reception unit 301 receives the common parameter. The key generation unit 302 generates an encryption key ek and a conversion key generation key tk. Although not shown, the key generation unit 302 may have random number generation functionality in order to generate these keys. The key transmission unit 303 transmits the encryption key ek to the encryption apparatus 400 and transmits the encryption key ek and the conversion key generation key tk to the conversion key generation apparatus 500.

Figure 4:
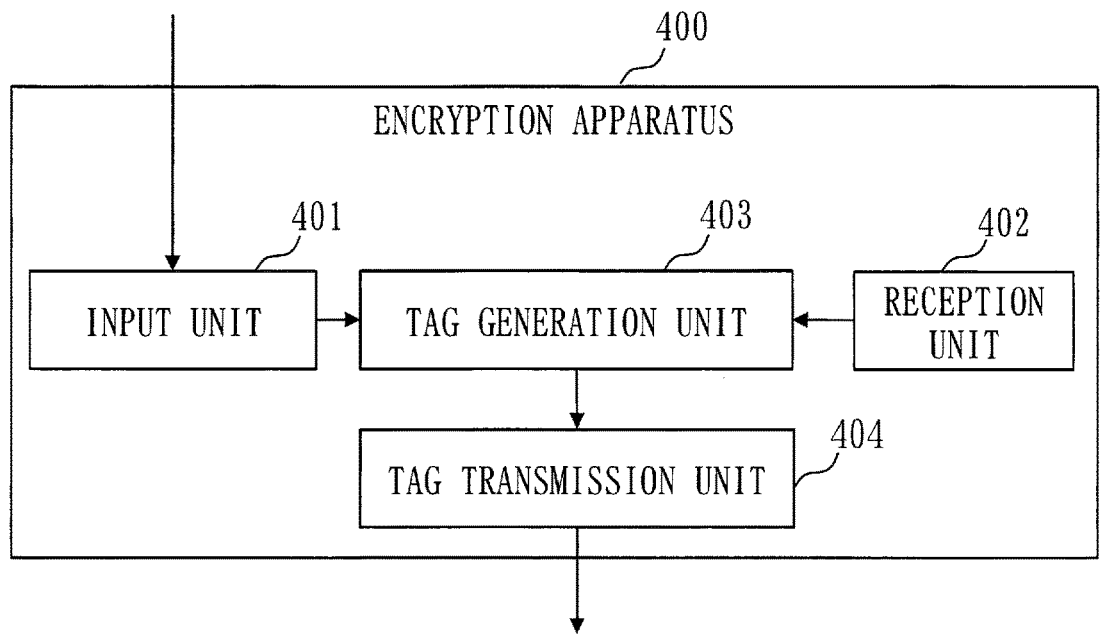
FIG. 4 is a diagram of Embodiment 1 and is a block diagram showing a configuration of an encryption apparatus 400.

FIG. 4 is a block diagram showing a configuration of the encryption apparatus 400. As shown in FIG. 4, the encryption apparatus 400 includes an input unit 401, a reception unit 402, a tag generation unit 403, and a tag transmission unit 404. Although not shown, the encryption apparatus 400 includes a recording medium for storing data used in the components of the encryption apparatus 400. To the input unit 401, the plaintext M is input. The reception unit 402 receives the encryption key ek. The tag generation unit 403 generates the encryption tag ETag. Although not shown, the tag generation unit 403 may have random number generation functionality in order to generate the encryption tag ETag. The tag transmission unit 404 transmits the encryption tag ETag generated by the tag generation unit 403 to the tag conversion apparatus 600.

Figure 5:
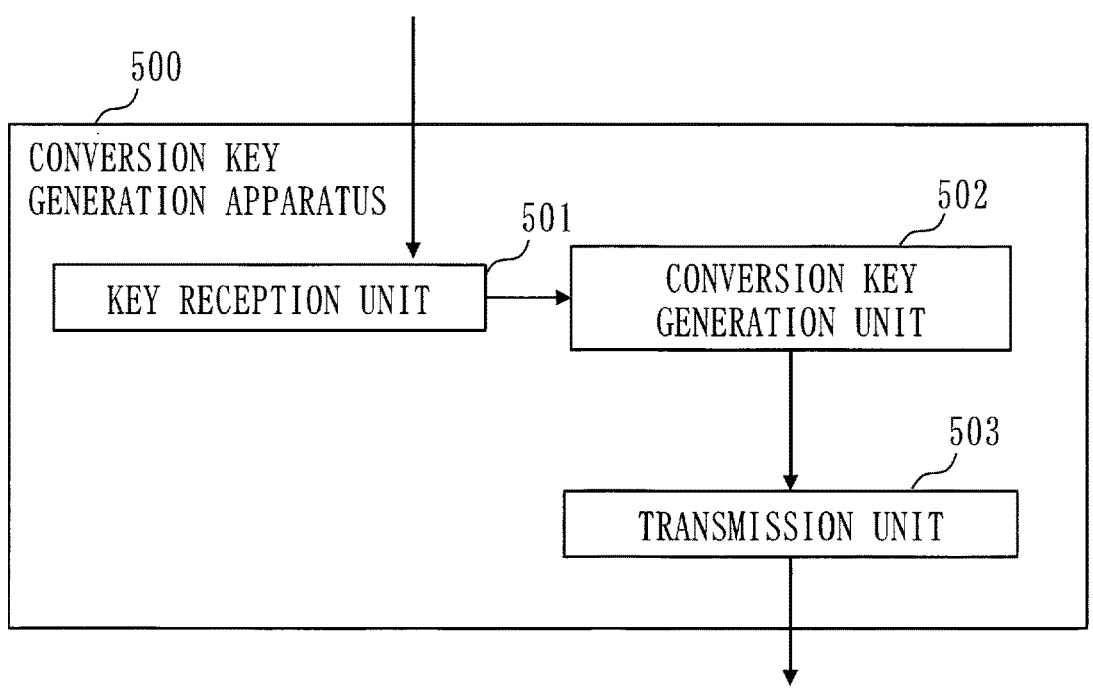
FIG. 5 is a diagram of Embodiment 1 and is a block diagram showing a configuration of a conversion key generation apparatus 500.

FIG. 5 is a block diagram showing a configuration of the conversion key generation apparatus 500. The conversion key generation apparatus 500 includes a key reception unit 501, a conversion key generation unit 502, and a transmission unit 503. Although not shown, the conversion key generation apparatus 500 includes a recording medium for storing data used in the components of the conversion key generation apparatus 500. The key reception unit 501 receives the encryption key ek and the conversion key generation key tk. The conversion key generation unit 502 generates a conversion key ck from the encryption key ek and the conversion key generation key tk. Although not shown, the conversion key generation unit 502 may have random number generation functionality in order to generate the conversion key ck. The transmission unit 503 transmits the conversion key ck to the tag conversion apparatus 600.

Figure 6:
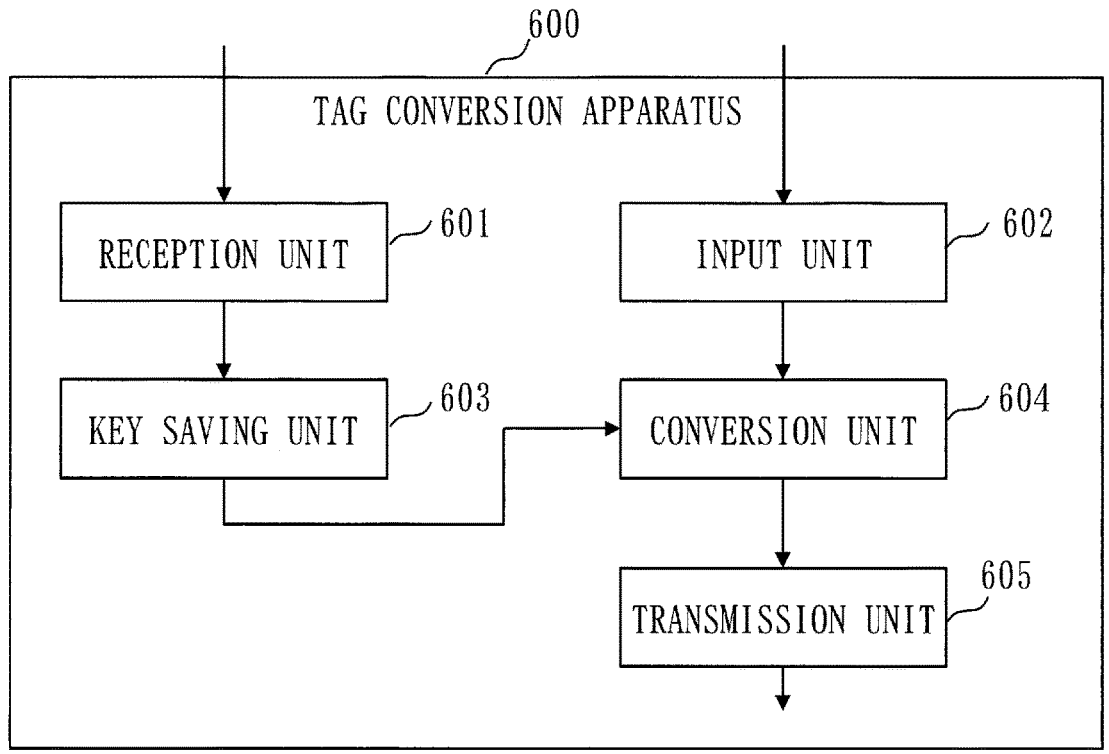
FIG. 6 is a diagram of Embodiment 1 and is a block diagram showing a configuration of a tag conversion apparatus 600.

FIG. 6 is a block diagram showing a configuration of the tag conversion apparatus 600. The tag conversion apparatus 600 is an encrypted data conversion apparatus.

The tag conversion apparatus 600 includes a reception unit 601, an input unit 602, a key saving unit 603, a conversion unit 604, and a transmission unit 605. Although not shown, the tag conversion apparatus 600 includes a recording medium for storing data used in the components of the tag conversion apparatus 600.

The reception unit 601 receives the conversion key ck. The input unit 602 receives the encryption tag ETag. The key saving unit 603 saves the conversion key ck. The conversion unit 604 converts the encryption tag ETag input at the input unit 602 into an encryption tag T that can be deduplicated, using the conversion key ck saved in the key saving unit 603. Although not shown, the conversion unit 604 may have random number generation functionality in order to convert the encryption tag ETag to the encryption tag T. The transmission unit 605 transmits the encryption tag T, which is encrypted data that can be deduplicated, to the match determination apparatus 700.

Figure 7:
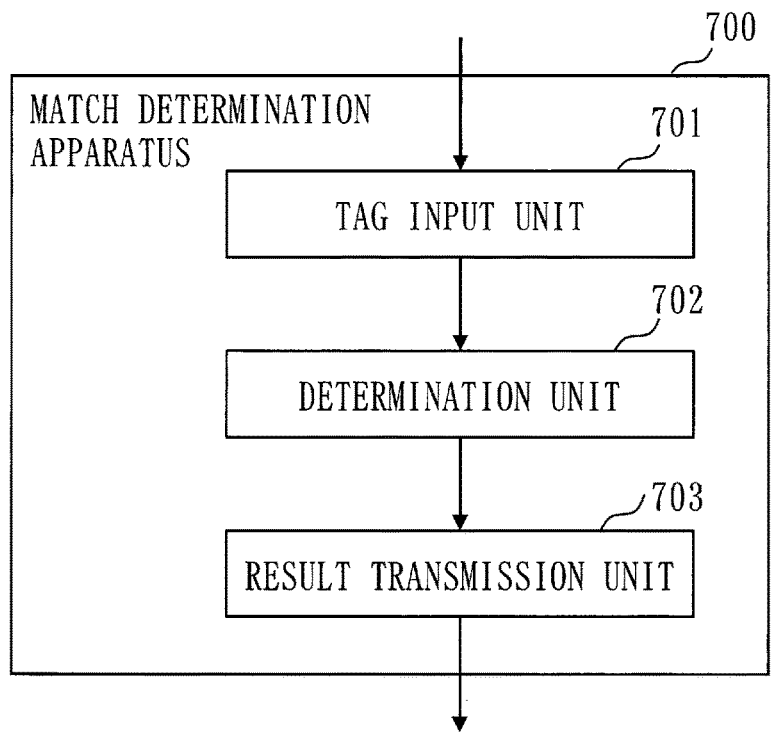
FIG. 7 is a diagram of Embodiment 1 and is a block diagram showing a configuration of a match determination apparatus 700.

FIG. 7 is a block diagram showing a configuration of the match determination apparatus 700. The match determination apparatus 700 includes a tag input unit 701, a determination unit 702, and a result transmission unit 703. Although not shown, the match determination apparatus 700 includes a recording medium for storing data used in the components of the match determination apparatus 700. To the tag input unit 701, an encrypted encryption tag T1, which can be deduplicated, and an encrypted encryption tag T2, which can be deduplicated, are input. The determination unit 702 determines whether the values of the encryption tag T1 and the encryption tag T2 match. The result transmission unit 703 outputs a determination result on whether they match.

Operations of the individual apparatuses in the deduplication system 100 are now described.

Figure 8:
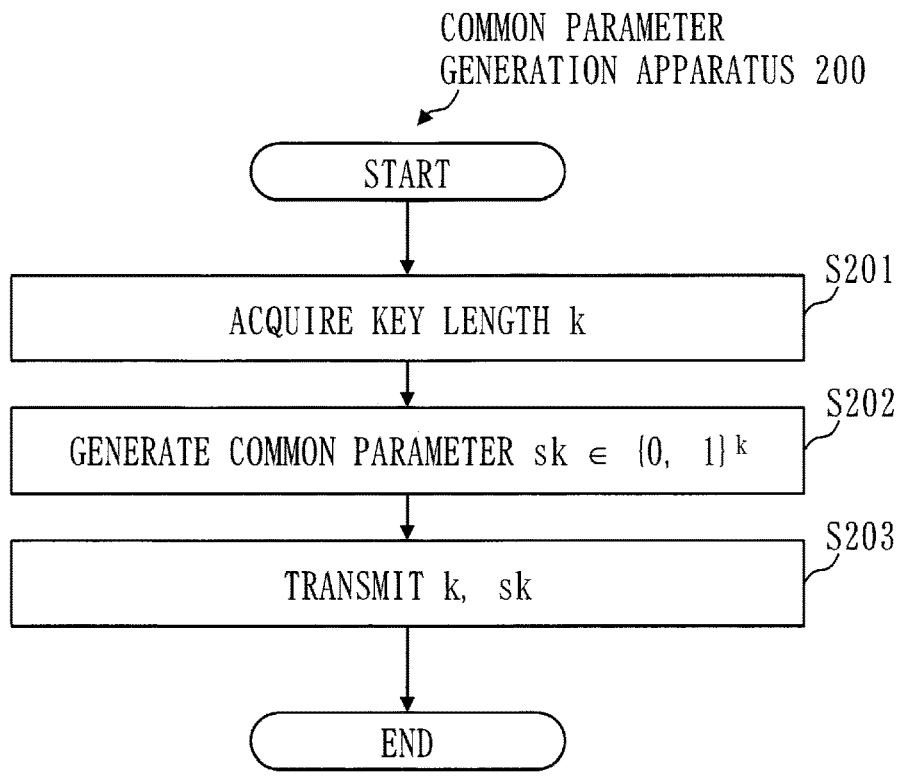
FIG. 8 is a diagram of Embodiment 1 and is a flowchart illustrating operation of the common parameter generation apparatus 200.

FIG. 8 is a flowchart illustrating the operation of the common parameter generation apparatus 200.

Figure 9:
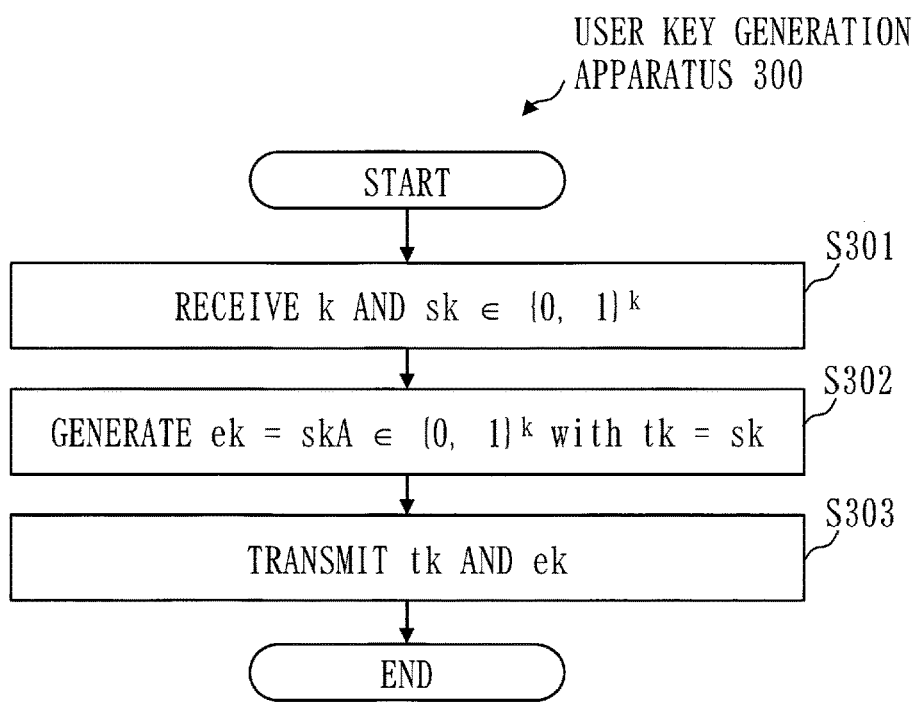
FIG. 9 is a diagram of Embodiment 1 and is a flowchart illustrating operation of the user key generation apparatus 300.

FIG. 9 is a flowchart illustrating the operation of the user key generation apparatus 300.

Figure 10:
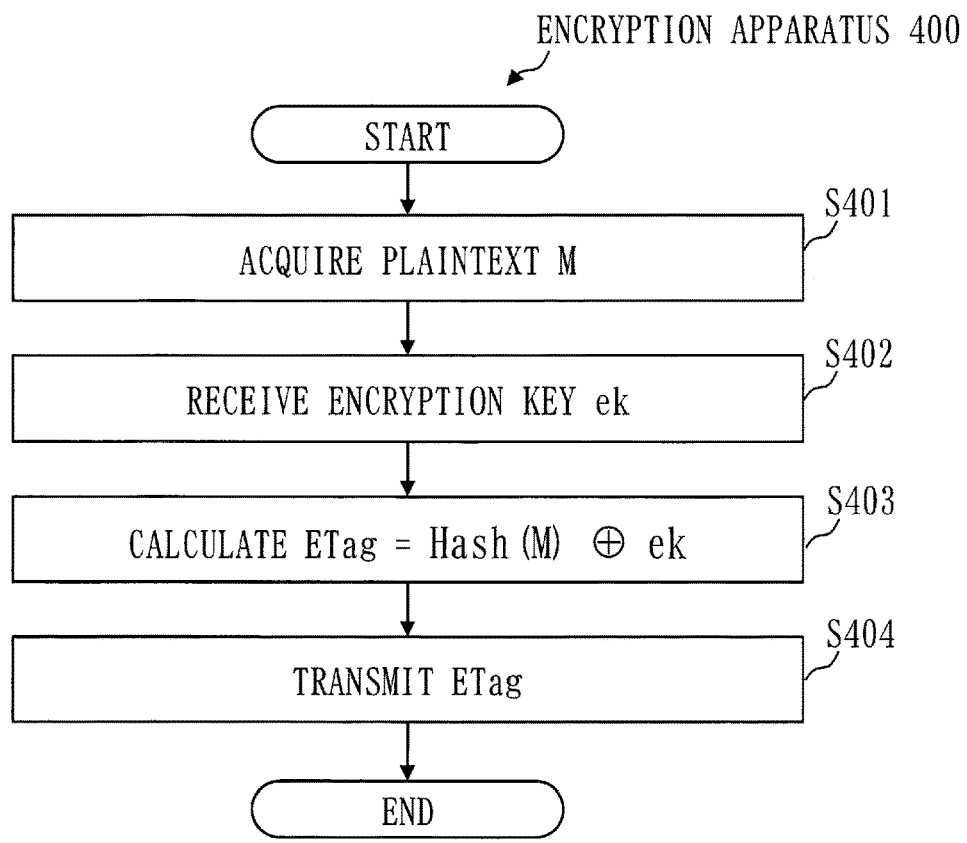
FIG. 10 is a diagram of Embodiment 1 and is a flowchart illustrating operation of the encryption apparatus 400.

FIG. 10 is a flowchart illustrating the operation of the encryption apparatus 400. The encryption apparatus 400 generates an encryption tag ETag which is an encryption of the plaintext M, using the encryption key ek and the plaintext M.

Figure 11:
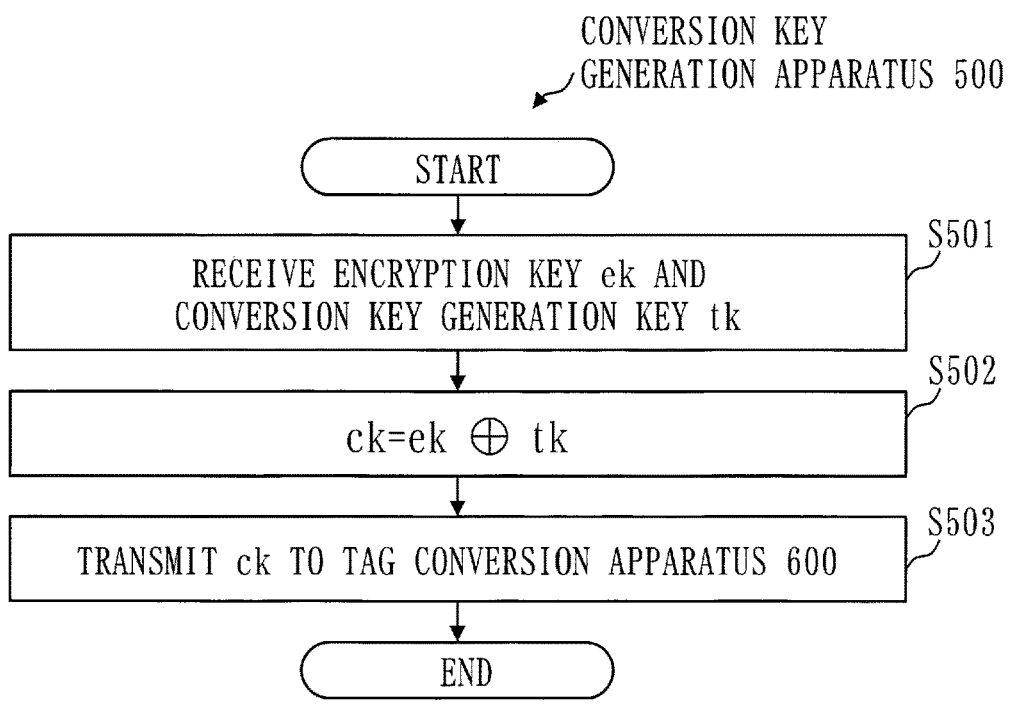
FIG. 11 is a diagram of Embodiment 1 and is a flowchart illustrating operation of the conversion key generation apparatus 500.

FIG. 11 is a flowchart illustrating the operation of the conversion key generation apparatus 500. The conversion key generation apparatus 500 generates a conversion key ck using the encryption key ek and the conversion key generation key tk.

Figure 12:
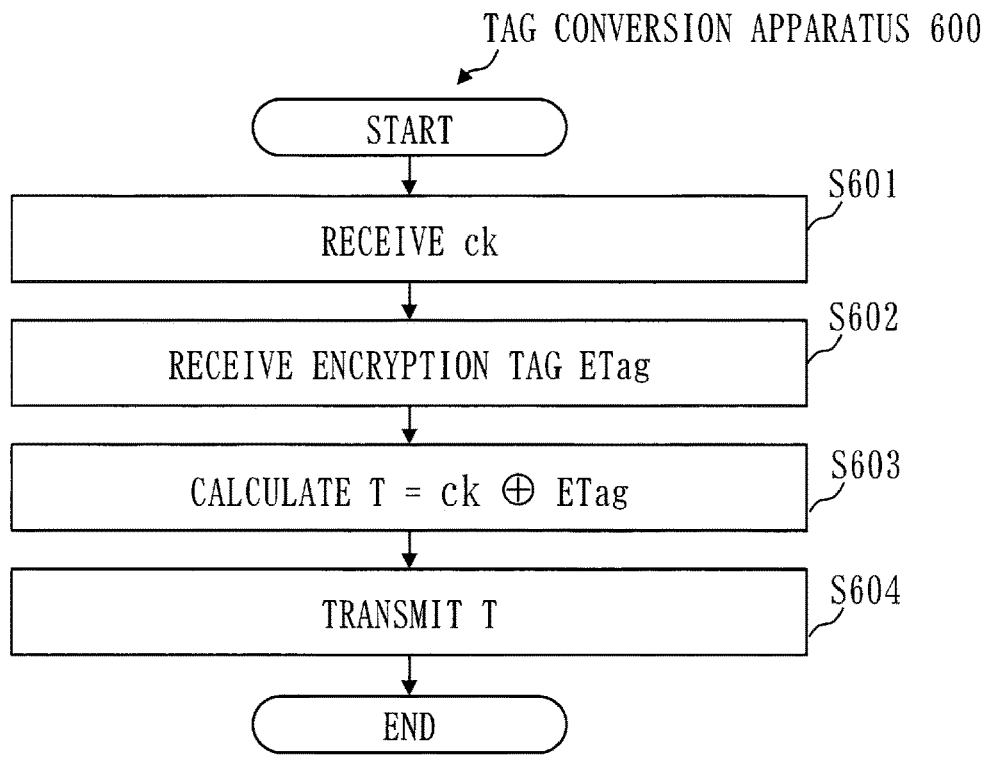
FIG. 12 is a diagram of Embodiment 1 and is a flowchart illustrating operation of the tag conversion apparatus 600.

FIG. 12 is a flowchart illustrating the operation of the tag conversion apparatus 600. By applying the conversion key ck to the encryption tags ETag, the tag conversion apparatus 600 converts an encryption tag ETag for which the same plaintext M has been used into an encryption tag T that takes the same value regardless of the value of the encryption key ek used for the encryption tag ETag.

Figure 13:
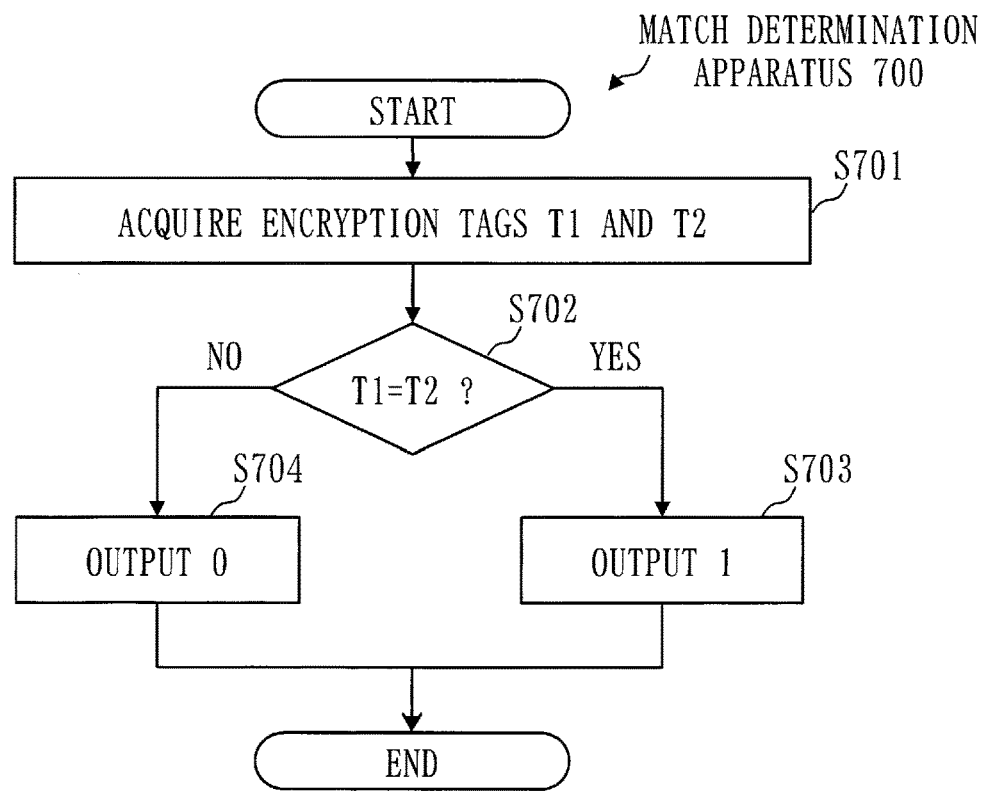
FIG. 13 is a diagram of Embodiment 1 and is a flowchart illustrating operation of the match determination apparatus 700.

FIG. 13 is a flowchart illustrating the operation of the match determination apparatus 700. The match determination apparatus 700 determines whether the values of two pieces of second encrypted data T match.

Figure 14:
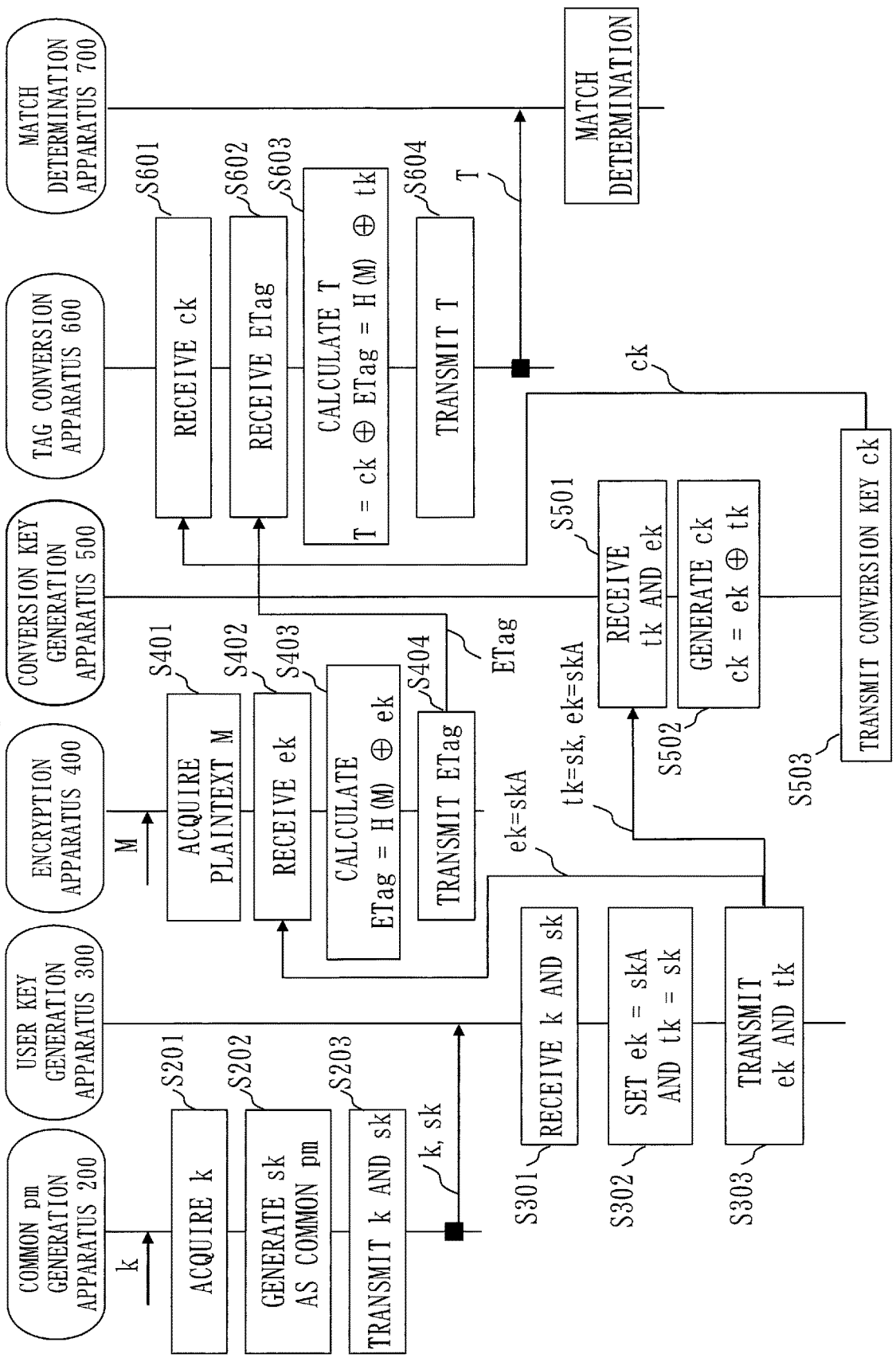
FIG. 14 is a diagram of Embodiment 1 showing operation of the deduplication system 100.

FIG. 14 is a diagram showing the flowcharts of FIGS. 8 to 13 as a sequence.

Referring to FIG. 14, the operations of the individual apparatuses of the deduplication system 100 will be described.

A general operation of the deduplication system 100 shown in FIG. 14 is as follows. The encryption apparatus 400 calculates an exclusive OR of the encryption key ek and the plaintext M as the encryption tag ETag. The conversion key generation apparatus 500 calculates an exclusive OR of the encryption key ek and the conversion key generation key tk, and generates a calculation result thereof as the conversion key ck. The tag conversion apparatus 600 converts the encryption tag ETag into the encryption tag T, which is the second encrypted data, by applying the conversion key ck to the encryption tag ETag, which is the first encrypted data.

<Common Parameter Generation Apparatus 200>

At step S201, the bit length k is input to the input unit 201.

At step S202, the common parameter generation unit 202 generates a k-bit random value sk as a common parameter.

At step S203, the transmission unit 203 transmits the bit length k and the common parameter sk to the user key generation apparatus 300.

<User Key Generation Apparatus 300>

At step S301, the parameter reception unit 301 receives the bit length k and the common parameter sk from the common parameter generation apparatus 200.

At step S302, the key generation unit 302 generates a k-bit random value skA as the encryption key ek. The key generation unit 302 also sets the conversion key generation key tk as the encryption key sk.

At step S303, the key transmission unit 303 transmits the encryption key ek to the encryption apparatuses 400 and transmits the encryption key ek and the conversion key generation key tk to the conversion key generation apparatus 500.

<Encryption Apparatus 400>

At step S401, the plaintext M is input to the input unit 401.

At step S402, the reception unit 402 receives the encryption key ek from the user key generation apparatus 300.

At step S403, the tag generation unit 403 calculates:

$$ETag = Hash(M) \langle XOR \rangle skA \tag{1}$$

Here, Hash indicates a cryptographic hash function and can be SHA256, for example. <XOR> represents exclusive OR.

At step S404, the tag transmission unit 404 transmits the encryption tag ETag to the tag conversion apparatus 600.

<Conversion Key Generation Apparatus 500>

At step S501, the key reception unit 501 receives the encryption key ek and the conversion key generation key tk from the user key generation apparatus 300.

At step S502, the conversion key generation unit 502 calculates:

$$ck = ek \langle XOR \rangle tk = skA \langle XOR \rangle sk \tag{2}$$

At step S503, the transmission unit 503 transmits the conversion key ck to the tag conversion apparatus 600.

<Tag Conversion Apparatus 600>

At step S601, the reception unit 601 as a third key acquisition unit acquires the conversion key ck, which is a third key generated using the encryption key ek and the conversion key generation key tk, which is a second key.

At step S602, the input unit 602 as an acquisition unit acquires an encryption tag ETag, which is the first encrypted data and is an encryption of the plaintext M generated using the encryption key ek as the first key and the plaintext M.

At step S603, the conversion unit 604 converts an encryption tag ETag for which the same plaintext M has been used into an encryption tag T as the second encrypted data that takes the same value regardless of the value of the encryption key ek used for the encryption tag ETag. Specifically, it is done as follows.

In the deduplication system 100 of Embodiment 1, the same key is set for different users as the conversion key generation key tk=Sk that is set at step S302. Thus, according to expression (3) below, an encryption tag ETag for which the same plaintext M has been used is converted to an encryption tag T that takes the same value regardless of the value of the encryption key ek used for the encryption tag ETag.

$$\begin{aligned} T &= ck \langle XOR \rangle ETag \\ &= \{ek \langle XOR \rangle tk\} \langle XOR \rangle \{Hash(M) \langle XOR \rangle ek\} \\ &= tk \langle XOR \rangle Hash(M) \end{aligned} \tag{3}$$

is calculated.

At step S604, the transmission unit 605 as a transmission control unit transmits the encryption tags T to the match determination apparatus 700, which determines whether the values of two encryption tags T match.

At step S701, two encryption tags T1 and T2 are input to the tag input unit 701.

At step S702, the determination unit 702 verifies whether bit strings of the encryption tag T1 and the encryption tag T2 are equal. If the bit strings of the encryption tag T1 and the encryption tag T2 are determined to be equal by the determination unit 702, the result transmission unit 703 outputs 1 at step S703, and if the bit strings of the encryption tag T1 and the encryption tag T2 are determined to be different, the result transmission unit 703 outputs 0 at step S704.

Effect of Embodiment 1

In Embodiment 1, an encryption tag ETag generated with the encryption key ek which is different from person to person can be converted to the encryption tag T by using the conversion key ck.

Although the encryption tag ETag cannot be deduplicated, it has the de facto standard security of encryption. In addition, an encryption tag T converted from the encryption tag ETag can be deduplicated. Thus, according to Embodiment 1, a cryptographic system having high security can be provided without losing the convenience of deduplication.

Embodiment 2

Referring to FIGS. 15 to 23, the deduplication system 100 in Embodiment 2 is described. In Embodiment 1, the encryption tag ETag was generated with the exclusive OR of a hash value of plaintext M and the encryption key ek at step S403. In Embodiment 2, the encryption tag ETag is generated by means of pairing computation.

The configuration of the deduplication system 100 is the same as FIG. 1 of Embodiment 1. The configurations of the common parameter generation apparatus 200, the user key generation apparatuses 300, the encryption apparatuses 400, the conversion key generation apparatus 500, the tag conversion apparatus 600, and the match determination apparatus 700 are also the same as FIGS. 2 to 7 of Embodiment 1.

Figure 15:
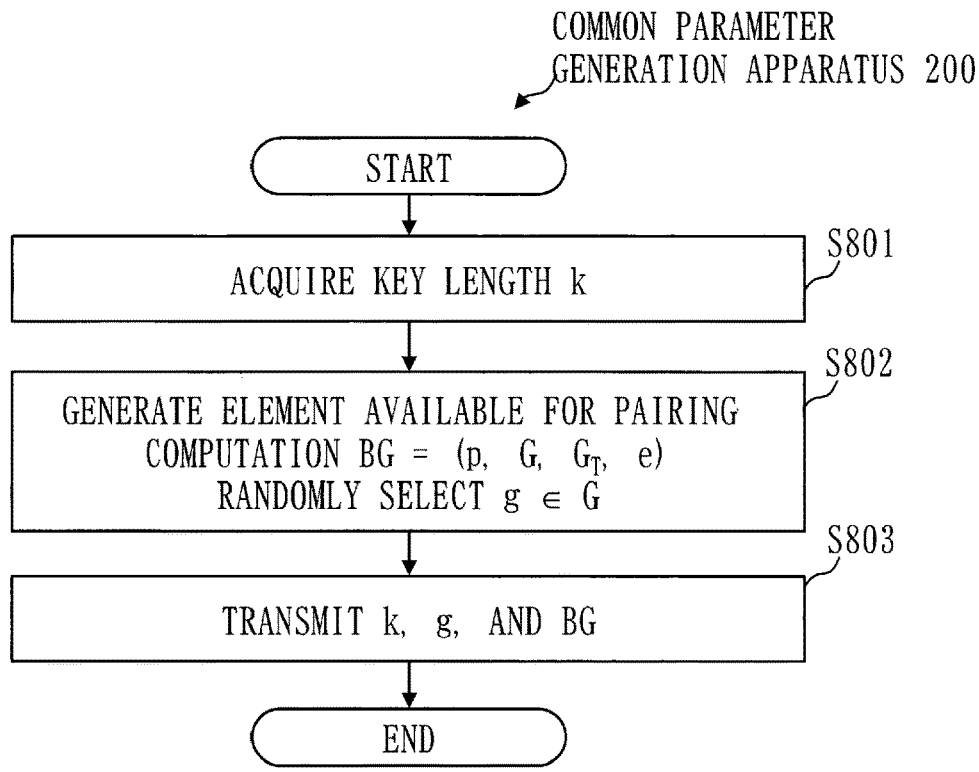
FIG. 15 is a diagram of Embodiment 2 and is a flowchart illustrating operation of the common parameter generation apparatus 200.

FIG. 15 is a flowchart illustrating the operation of the common parameter generation apparatus 200.

Figure 16:
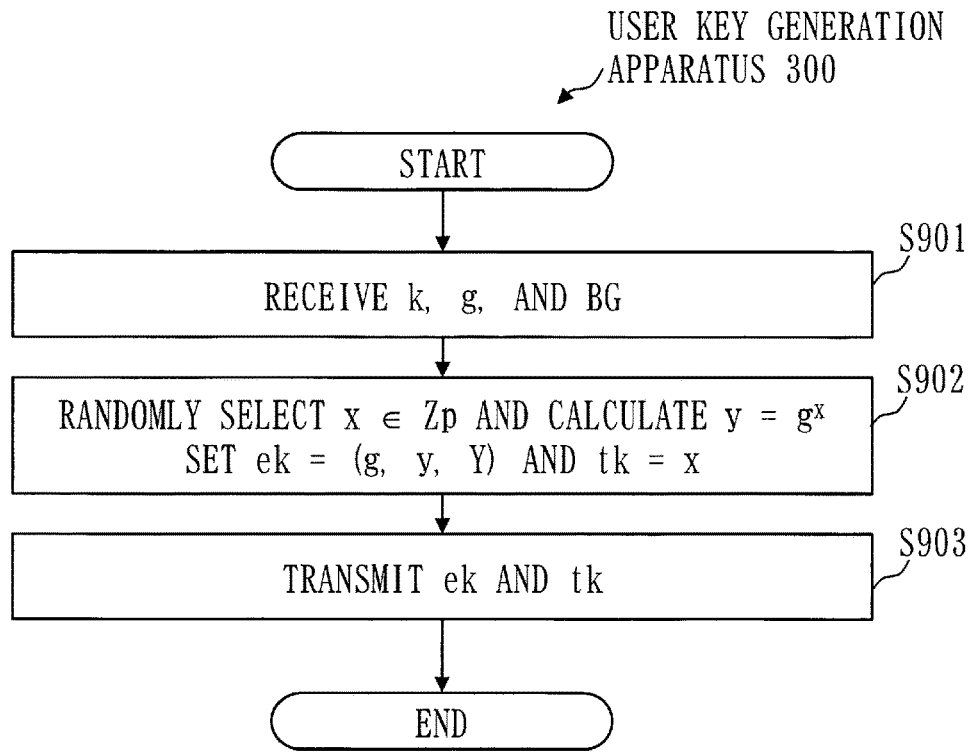
FIG. 16 is a diagram of Embodiment 2 and is a flowchart illustrating operation of the user key generation apparatus 300.

FIG. 16 is a flowchart illustrating the operation of the user key generation apparatus 300.

Figure 17:
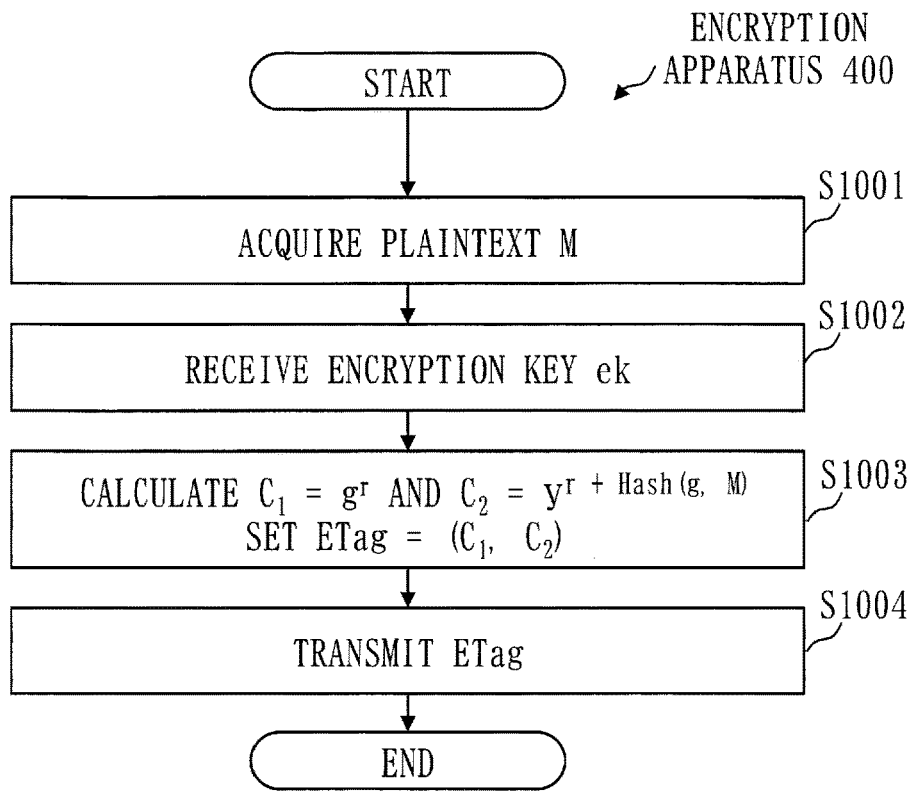
FIG. 17 is a diagram of Embodiment 2 and is a flowchart illustrating operation of the encryption apparatus 400.

FIG. 17 is a flowchart illustrating the operation of the encryption apparatus 400.

Figure 18:
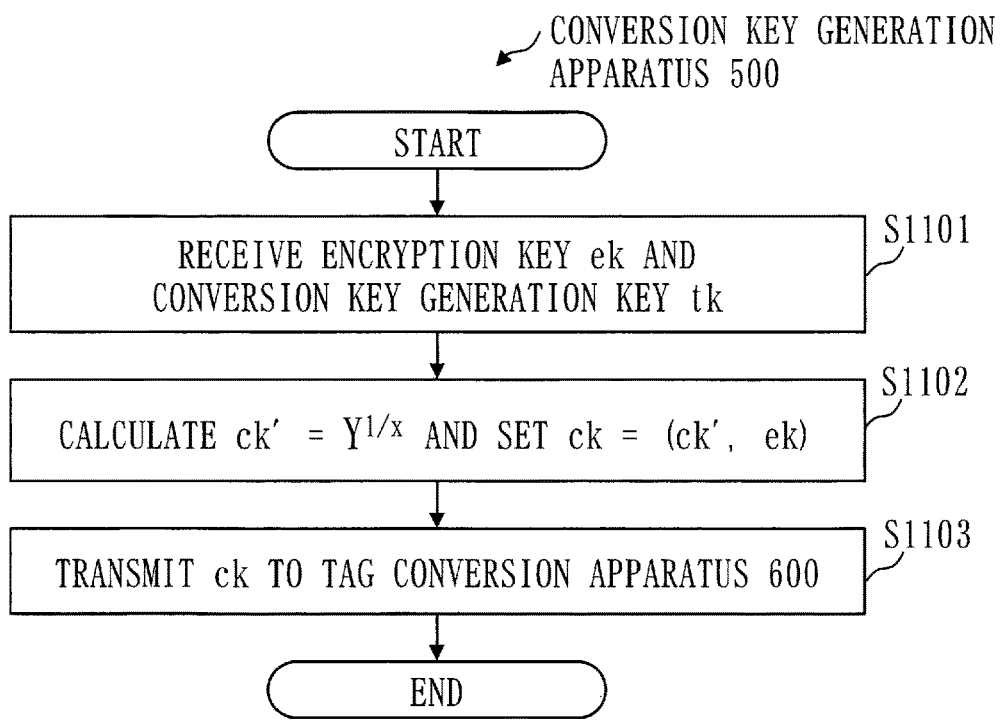
FIG. 18 is a diagram of Embodiment 2 and is a flowchart illustrating operation of the conversion key generation apparatus 500.

FIG. 18 is a flowchart illustrating the operation of the conversion key generation apparatus 500.

Figure 19:
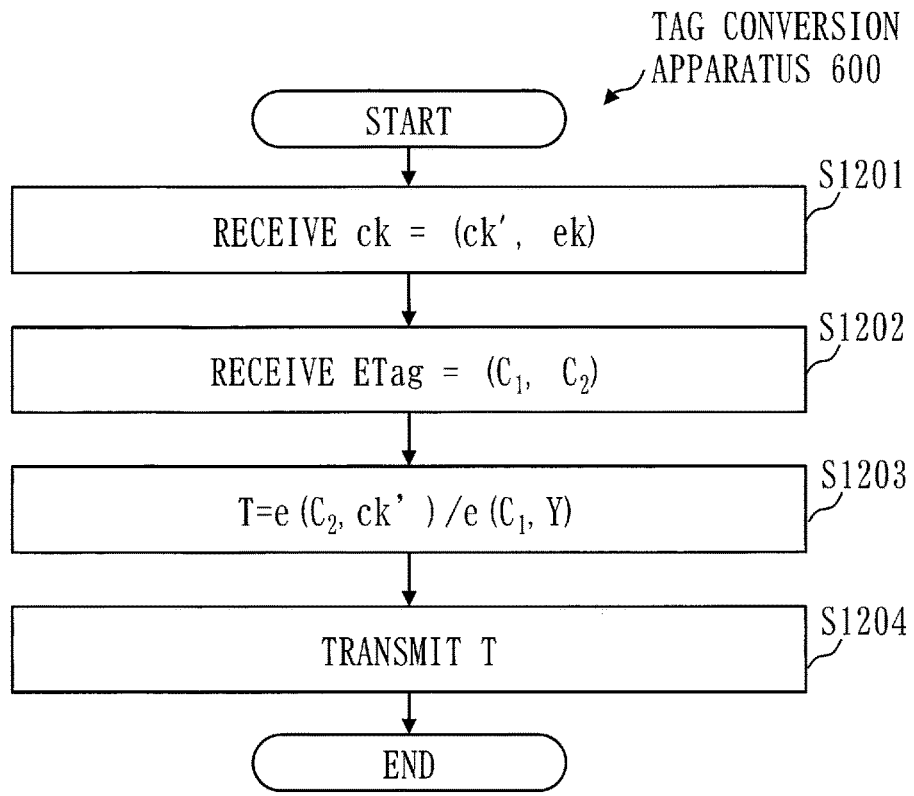
FIG. 19 is a diagram of Embodiment 2 and is a flowchart illustrating operation of the tag conversion apparatus 600.

FIG. 19 is a flowchart illustrating the operation of the tag conversion apparatus 600.

Figure 20:
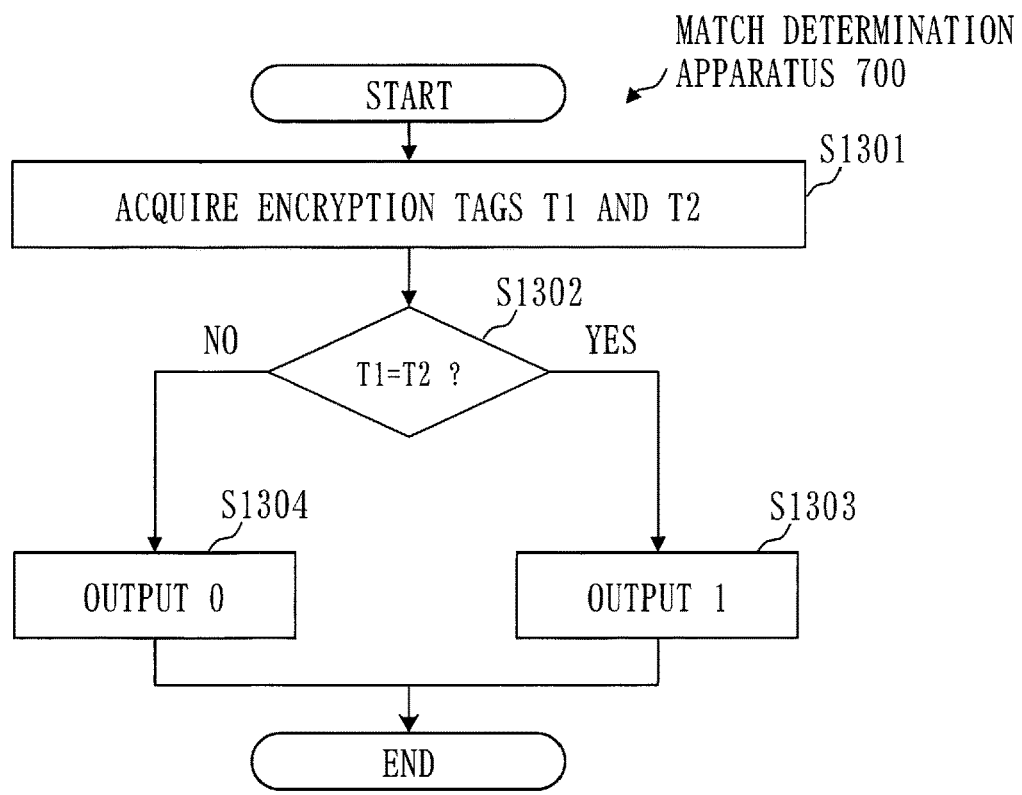
FIG. 20 is a diagram of Embodiment 2 and is a flowchart illustrating operation of the match determination apparatus 700.

FIG. 20 is a flowchart illustrating the operation of the match determination apparatus 700.

Figure 21:
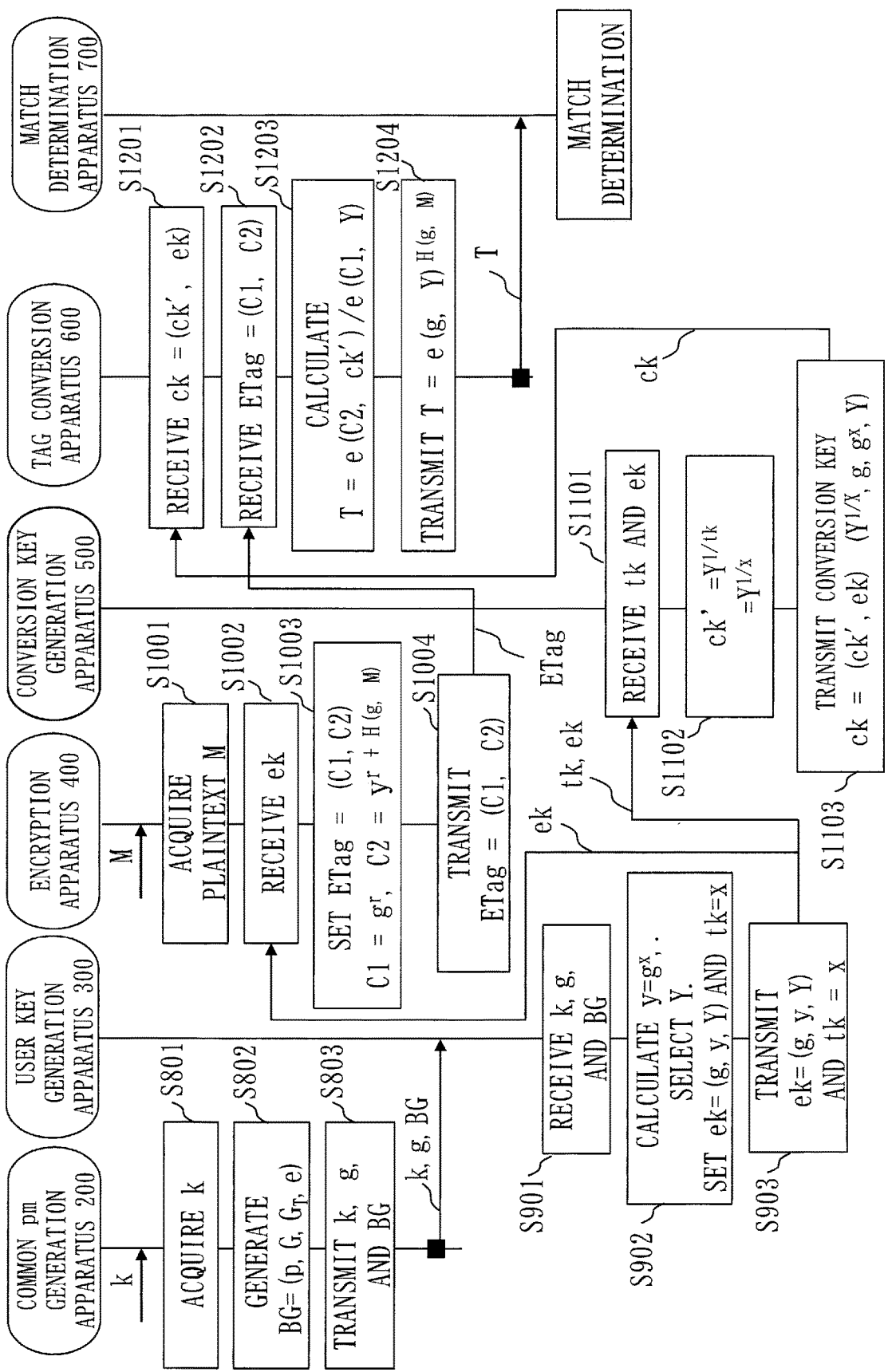
FIG. 21 is a diagram of Embodiment 2 showing operation of the deduplication system 100.

FIG. 21 is a diagram showing the flowcharts of FIGS. 15 to 20 as a sequence.

Referring to FIG. 21, the operations of the individual apparatuses of the deduplication system 100 will be described.

<Common Parameter Generation Apparatus 200>

At step S801, the bit length k is input to the input unit 201.

At step S802, based on the bit length k, the common parameter generation unit 202 generates an element available for pairing computation:

$$BG=(p,G,G_T,e) \quad (4)$$

Here, p represents the order of group G and group $G_T$.
e is a bilinear mapping with a mapping of $G \times G \to G_T$.
A bilinear mapping is a mapping such that $$e(g^a, g^b) = e(g,g)^{ab} \in G_T \quad (5)$$

holds for all $g \in G$, and a, $b \in Z_p$. Computation using this e is called pairing computation.

$Z_p$ is a set of integers with mod=p.
$g \in G$ is randomly selected.

At step S803, the transmission unit 203 transmits the bit length k, g, and the element BG to the user key generation apparatus 300.

<User Key Generation Apparatus 300>

At step S901, the parameter reception unit 301 receives the bit length k, g, and BG from the common parameter generation apparatus 200.

At step S902, the key generation unit 302 randomly selects $x \in Z_p$ and calculates:

$$y = g^x.$$

The key generation unit 302 also selects $Y \in G$.
The key generation unit 302 sets:

$$\text{encryption key } ek=(g,y,Y) \quad (6), \text{ and}$$

$$\text{conversion key generation key } tk=x \quad (7)$$

The encryption key ek as the first key includes a first element, a second element, and a third element. In the encryption key ek, g is the first element, y is the second element, and Y is the third element.

At step S903, the key transmission unit 303 transmits the encryption key ek to the encryption apparatus 400 and transmits the encryption key ek and the conversion key generation key tk to the conversion key generation apparatus 500.

<Encryption Apparatus 400>

At step S1001, the plaintext M is input to the input unit 401.

At step S1002, the reception unit 402 receives the encryption key ek from the user key generation apparatus 300.

At step S1003, the tag generation unit 403 calculates:

$$C_1 = g^r, C_2 = y^{r + Hash(g,M)} \quad (8)$$

and sets:

$$ETag=(C_1,C_2)=(g^r, y^{x\{r+Hash(g,M)\}}) \quad (9)$$

and the encryption tag ETag.

Here, Hash indicates a cryptographic hash function and can be SHA256, for example.

At step S1004, the tag transmission unit 404 transmits the encryption tag ETag to the tag conversion apparatus 600.

As shown in expression 9, the encryption apparatus 400 as the encryption unit encrypts the plaintext M using the first element g and the second element y. The encryption apparatus 400 generates, as the ETag, data which is an encryption of the plaintext M <Conversion Key Generation Apparatus 500>

At step S1101, the key reception unit 501 receives:

encryption key $ek=(g,y,Y)=(g,g^x,Y)$, and conversion key generation key $tk=x$ from the user key generation apparatus 300.

At step S1102, the conversion key generation unit 502 calculates:

$$ck' = Y^{1/x} \quad (10)$$

At step S1103, the transmission unit 503 transmits:

the conversion key $ck=(ck',ek)$ to the tag conversion apparatus 600.

As in expression 10 and the expression of the conversion key ck shown above, the conversion key generation apparatus 500 as the third key generation unit applies the conversion key generation key tk, which is the second key, to the third element Y and generates, as a conversion key ck, which is the third key, a pair of a value ck' resulting from applying the conversion key generation key tk to the third element Y and the encryption key ek, which is the first key.

<Tag Conversion Apparatus 600>

At step S1201, the reception unit 601 receives:

conversion key $ck=(ck',ek)=(Y^{1/x}, g, g^x, Y)$ from the conversion key generation apparatus 500.

At step S1202, to the input unit 602, the encryption tag:

$$ETag=(C_1,C_2)=(g^r, g^{x\{r+Hash(g,M)\}})$$

is input.

At step S1203, the conversion unit 604 converts an encryption tag ETag for which the same plaintext M has been used into an encryption tag T as the second encrypted data that takes the same value regardless of the value of the encryption key ek used for the encryption tag ETag. Specifically, it is done as follows.

In the deduplication system 100 of Embodiment 2, the same values are set for different users as the g selected at step S802 and the Y selected at step S902. Thus, according to expression (11) below, an encryption tag ETag for which the same plaintext M has been used is converted to an encryption tag T that takes the same value regardless of the value of the encryption key ek used for the encryption tag ETag.

The conversion unit 604 calculates:

$$\begin{aligned} T &= e(C_2, ck')/e(C_1, Y) \\ &= e(g^{x\{r+Hash(g,M)\}}, Y^{1/x})/e(g^r, Y) \\ &= e(g, Y)^{x\{r+Hash(g,M)\}\cdot 1/x}/e(g,Y)^r \\ &= e(g, Y)^{\{r+Hash(g,M)\}}/e(g,Y)^r \\ &= e(g, Y)^{Hash(g,M)} \end{aligned} \quad (11)$$

e represents a pairing computation.

At step S1204, the transmission unit 605 transmits the encryption tag T converted from the encryption tag ETag to the match determination apparatus 700.

<Match Determination Apparatus 700>

At step S1301, two encryption tags T1 and T2 are input to the tag input unit 701.

At step S1302, the determination unit 702 verifies whether bit strings of the encryption tag T1 and the encryption tag T2 are equal.

At step S1302, if the bit strings of the encryption tag T1 and the encryption tag T2 are determined to be equal by the determination unit 702, the result transmission unit 703 outputs 1 at step S1303, and if the bit strings of the encryption tag T1 and the encryption tag T2 are determined to be different, the result transmission unit 703 outputs 0 at step S1304.

Effect of Embodiment 2

According to Embodiment 2, a cryptographic system of a public key approach can be made a cryptographic system having high security without losing the convenience of deduplication.

Figure 22:
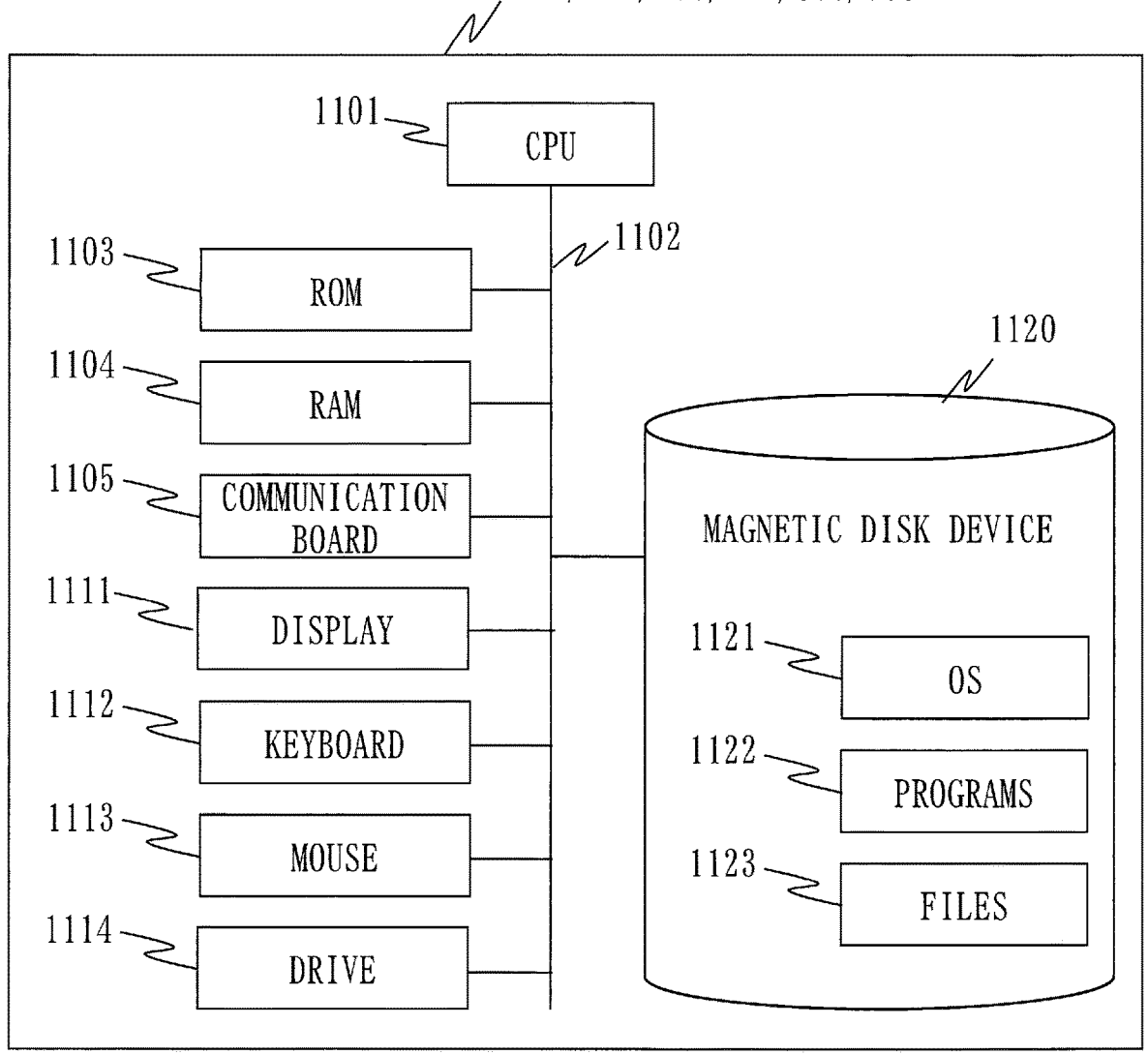
FIG. 22 is a diagram of Embodiment 2 showing hardware resources of the respective apparatuses included in the deduplication system 100.

FIG. 22 is a diagram showing a hardware configuration of the common parameter generation apparatus 200, the multiple user key generation apparatuses 300, the encryption apparatuses 400, the conversion key generation apparatus 500, the tag conversion apparatus 600, and the match determination apparatus 700 in Embodiments 1 and 2.

The common parameter generation apparatus 200, the multiple user key generation apparatuses 300, the encryption apparatuses 400, the conversion key generation apparatus 500, the tag conversion apparatus 600, and the match determination apparatus 700 are computers. FIG. 22 is a hardware configuration of the common parameter generation apparatus 200 through the match determination apparatus 700, which are computers.

As the common parameter generation apparatus 200 through the match determination apparatus 700 have the same hardware configuration, the encryption apparatus 400 will be described as a representative.

In FIG. 22, the encryption apparatus 400 includes a CPU 1101 (Central Processing Unit).

The CPU 1101 is connected with hardware devices such as a ROM 1103, a RAM 1104, a communication board 1105, a display 1111, a keyboard 1112, a mouse 1113, a drive 1114, and a magnetic disk device 1120 via a bus 1102 and controls these hardware devices.

The drive 1114 is a device to read and write storage media such as an FD (Flexible Disk Drive), a CD (Compact Disc), and a DVD (Digital Versatile Disc).

The ROM 1103, the RAM 1104, the magnetic disk device 1120, and the drive 1114 are examples of storage devices. The keyboard 1112, the mouse 1113, and the communication board 1105 are examples of input devices. The display 1111 and the communication board 1105 are examples of output devices.

The communication board 1105 is connected with a communication network such as a LAN, the Internet, and a telephone line by wire or wirelessly.

The magnetic disk device 1120 stores an operating system 1121, programs 1122, and files 1123.

In FIG. 22, the operating system 1121 is denoted as OS 1121.

The programs 1122 include programs for executing those functions that are described as " . . . units" in Embodiments 1 and 2.

The programs are read and executed by the CPU 1101.

That is, the programs cause computers to function as " . . . units" and cause computers to execute the procedure or methods of the " . . . units".

The files 1123 include various kinds of data such as input data, output data, determination results, calculation results, and processing results that are used in the " . . . units" described in Embodiments 1 and 2.

The arrows included in configuration diagrams and flowcharts in Embodiments 1 and 2 mostly indicate input and output of data and signals.

Processing in Embodiments 1 and 2 described with respect to a flowchart and the like is executed using hardware such as the CPU 1101, a storage device, an input device, and an output device.

Those that are described as " . . . units" in Embodiments 1 and 2 may be " . . . circuits", " . . . devices", or " . . . apparatus" and may also be " . . . steps", " . . . procedure", or " . . . process". That is, those that are described as " . . . units" may be implemented in any of firmware, software, hardware, or a combination thereof <Supplementary Note on Hardware Configuration>

In the hardware configuration shown in FIG. 22, the functions of the individual apparatuses are implemented in software. However, the functions of the apparatuses may also be implemented in hardware.

As with FIG. 22, this will be described with the encryption apparatus 400 as a representative.

Figure 23:
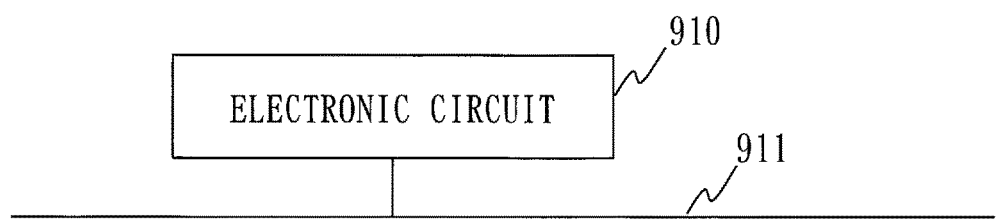
FIG. 23 is a diagram of Embodiment 2 additionally showing hardware resources of the respective apparatuses included in the deduplication system 100.

FIG. 23 shows a configuration in which the functions of the encryption apparatus 400 are implemented by hardware. An electronic circuit 910 of FIG. 23 is a dedicated electronic circuit for implementing the functions of the input unit 401, the reception unit 402, the tag generation unit 403, and the tag transmission unit 404 of the encryption apparatus 400. The electronic circuit 910 is connected to a signal line 911. The electronic circuit 910 is specifically a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array. The functions of the components of the encryption apparatus 400 may be implemented in one electronic circuit or implemented as being distributed across multiple electronic circuits. Also, some of the functions of the components of the encryption apparatus 400 may be implemented by an electronic circuit and the remaining functions may be implemented by software.

Each of the CPU 1101 and the electronic circuit 910 is also called processing circuitry. In the encryption apparatus 400, the functions of the input unit 401, the reception unit 402, the tag generation unit 403, and the tag transmission unit 404 may be implemented by processing circuitry. Alternatively, the functions of the " . . . units" shown in FIGS. 2 to 7 may be implemented by processing circuitry.

REFERENCE SIGNS LIST ck: conversion key; ETag: encryption tag; T: encryption tag; ek: encryption key; M: plaintext; tk: conversion key generation key; 100: deduplication system; 101: network; 200: common parameter generation apparatus; 201: input unit; 202: common parameter generation unit; 203: transmission unit; 300: user key generation apparatus; 301: parameter reception unit; 302: key generation unit; 303: key transmission unit; 400: encryption apparatus; 401: input unit; 402: reception unit; 403: tag generation unit; 404: tag transmission unit; 500: conversion key generation apparatus; 501: key reception unit; 502: conversion key generation unit; 503: transmission unit; 600: tag conversion apparatus; 601: reception unit; 602: input unit; 603: key saving unit; 604: conversion unit; 605: transmission unit; 700: match determination apparatus; 701: tag input unit; 702: determination unit; 703: result transmission unit; 910: electronic circuit; 911: signal line.

The invention claimed is:

1. A cryptographic system comprising:
an encryption apparatus to generate first encrypted data using a first element and a second element included in any first key of a plurality of first keys each including the first element, the second element, and a third element and using plaintext, the first encrypted data being data which is an encryption of the plaintext and being data that has a different value even with the same plaintext when a value of the first key used in encryption is different;
a conversion key generation apparatus to apply a second key to the third element included in the first key used in the encryption of the plaintext, the second key being an element x belonging to a set of integers $Z_p$ with mod=p, and to generate, as a third key, a pair of a value resulting from applying the second key to the third element and the first key used in the encryption of the plaintext; and
a tag conversion apparatus to, by applying the third key to the first encrypted data, convert the first encrypted data for which the same plaintext has been used into second encrypted data that takes the same value regardless of the value of the first key used in the encryption of the first encrypted data; a match determination apparatus to determine whether values of two pieces of the second encrypted data match.

2. An encrypted data conversion apparatus comprising:
processing circuitry to:
acquire first encrypted data that is encrypted by using a first element and a second element included in any first key of a plurality of first keys each including the first element, the second element, and a third element and using plaintext, the first encrypted data being data which is an encryption of the plaintext and being data that has a different value even with the same plaintext when a value of the first key used in encryption is different;
acquire a third key generated as a pair of a value resulting from applying a second key to the third element included in the first key used in the encryption of the plaintext and the first key used in the encryption of the plaintext, the second key being an element x belonging to a set of integers $Z_p$ with mod=p;
convert the first encrypted data for which the same plaintext has been used into second encrypted data that takes the same value regardless of the value of the first key used in the encryption of the first encrypted data; and
transmit the second encrypted data to a match determination apparatus to determine whether values of two pieces of the second encrypted data match.

3. A non-transitory computer readable medium storing a conversion program that causes a computer to execute:
an acquisition process of acquiring first encrypted data that is encrypted by using a first element and a second element included in any first key of a plurality of first keys each including the first element, the second element, and a third element and using plaintext, the first encrypted data being data which is an encryption of the plaintext and being data that has a different value even with the same plaintext when a value of the first key used in encryption is different;
a third key acquisition process of acquiring a third key generated as a pair of a value resulting from applying a second key to the third element included in the first key used in the encryption of the plaintext and the first key used in the encryption of the plaintext, the second key being an element x belonging to a set of integers $Z_p$ with mod=p;
a conversion process of converting the first encrypted data for which the same plaintext has been used into second encrypted data that takes the same value regardless of the value of the first key used in the encryption of the first encrypted data; and
a transmission control process of transmitting the second encrypted data to a match determination apparatus to determine whether values of two pieces of the second encrypted data match.

* * * * *